United States Patent [19]

Bergkvist

[11] 4,166,699
[45] Sep. 4, 1979

[54] DEVICE FOR OPTIC, PREFERABLY VISUAL DETERMINATION OF A CERTAIN PLANE

[76] Inventor: Lars A. Bergkvist, 890 42 Mellansel, Gottne, Sweden

[21] Appl. No.: 841,121

[22] Filed: Oct. 11, 1977

[30] Foreign Application Priority Data

Oct. 15, 1976 [SE] Sweden .............................. 7611513

[51] Int. Cl.$^2$ ........................................... G01B 11/27
[52] U.S. Cl. ............................ 356/375; 250/237 G; 356/153; 356/401
[58] Field of Search ................ 356/110–111, 356/150–151, 169, 172, 153; 250/237 G

[56] References Cited
U.S. PATENT DOCUMENTS

| 3,572,942 | 3/1971 | Te Kronnie | 356/172 |
| 3,604,813 | 9/1971 | Te Kronnie | 356/172 |

*Primary Examiner*—John K. Corbin
*Assistant Examiner*—Wm. H. Punter
*Attorney, Agent, or Firm*—Silverman, Cass & Singer, Ltd.

[57] ABSTRACT

A device or planoscope for determining a certain plane through the use of a change in an angle of bands of a moire interference pattern. The device may have several sets of screens of opaque lines separated by transparent lines. Each set of screens has a rearward screen of lines and two forward screens of lines. The first forward screen is angled relative to the length of the rearward screen and the second forward screen is parallel to the rearward screen and is located adjacent a side of the first forward screen. The lines of all three screens are parallel to each other and to the length of the rearward screen. The number of lines per unit width of the rearward screen is different than the number of lines per unit width of the forward screens. When the rearward screen is viewed through the forward screens in the certain plane, the bands of the moire interference pattern which arises are parallel to the screen lines. When the rearward screen is viewed through the forward screens outside of the certain plane, the bands of the interference pattern formed by the rearward screen and the second forward screen are parallel to the screen lines, while the bands of the interference pattern formed by the rearward screen and the first forward screen are angled relative to the screen lines.

15 Claims, 10 Drawing Figures

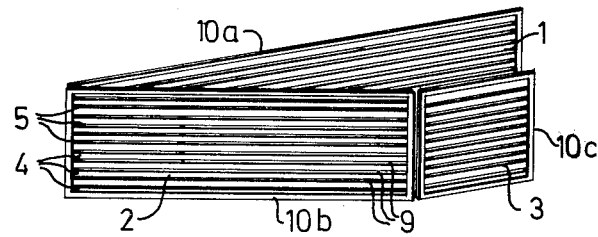
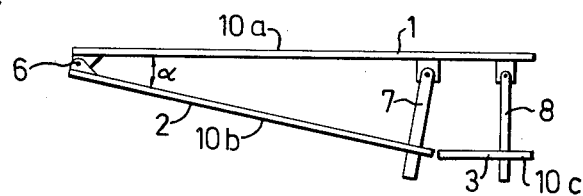
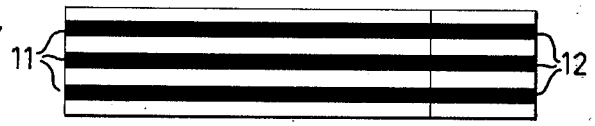
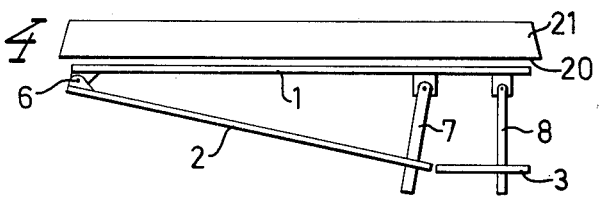

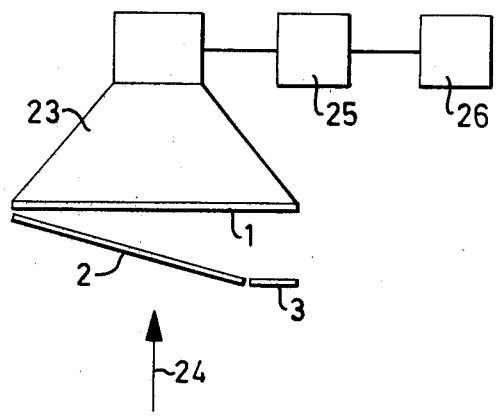
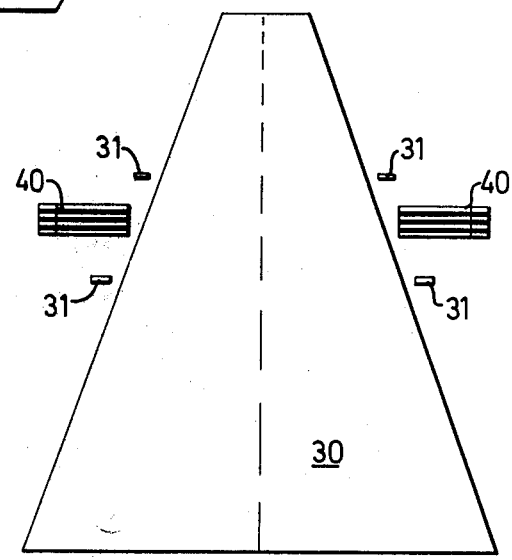

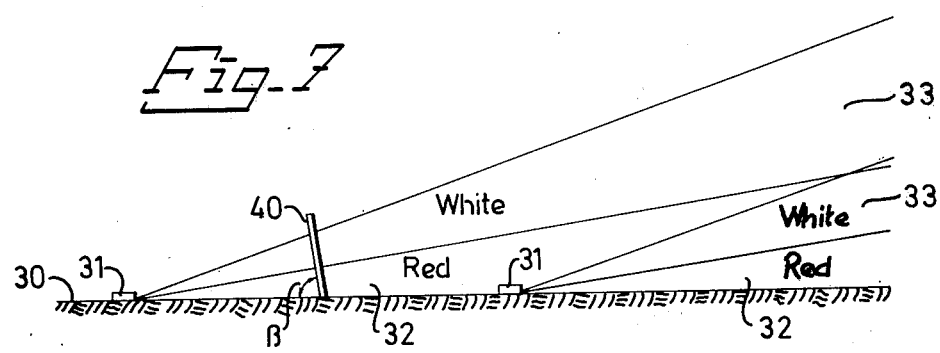
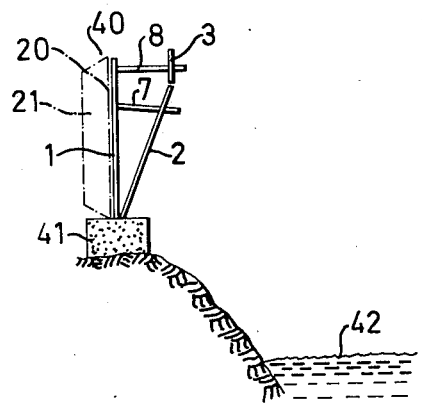

DEVICE FOR OPTIC, PREFERABLY VISUAL DETERMINATION OF A CERTAIN PLANE

This invention relates to a device for determining a certain plane in an optic, preferably visual manner. The device according to the invention is primarily intended for stationary use. When optically, preferably visually viewing the device, information is received whether or not one is in said certain plane defined by the device, and information also is obtained on how to move in relation to the device in order to be in said certain plane.

A well-known device for visually determining a certain plane for navigation purposes are beacons. A known device for determining visually a plane forming an angle with the horizontal plane is a planoscope built up of screens. Beacons and similar arrangements, however, are so constructed that it is not possible by viewing the arrangement to decide how one must move in relation to the arrangement in order to be in a plane defined by the arrangement. A beacon in most cases emits light of different colors in different sectors, thereby providing guidance how to move in order to get into the desired light sector. But in said sector no information is given on the position on the vertical plane coinciding with the bisector of the sector in question. Therefore, for navigation often the boundary between two sectors is used for determining the position. Said boundary, however, often is not the safest route to a beacon.

Planoscopes built up of screens are so constructed that, when viewing the planoscope in the plane defined thereby, a number of dark bands are seen having such angular relationship as to be given lying form. When viewing the planoscope in a plane deviating from said plane, dark bands are seen with the same angular relationship as above, but where two bands running toward each other do not meet but are located offset relative to each other. When using the planoscope, thus, reading is made whether two bands meet exactly to form a V or are located offset relative to each other. It is very difficult to distinguish a small such displacement from an exact meeting of the bands. Consequently, the precision achievable with a known planoscope is not always satisfactory.

The present invention comprises a device where a reading pattern is provided, which is designed so that the eye is very sensitive to changes in the pattern, even at a very long distance. The planoscope further has the disadvantage that it cannot be used at a long distance, for example such as concerned with road construction etc. for obtaining a large extension of the road in plane state, because at long distances the number of black bands decreases and simultaneously each band increases its size, and at a certain distance the entire surface of the planoscope is covered thereby, which mostly gives the impression of a uniform color.

The present invention solves the aforesaid problems, as will become apparent from the following.

The invention relates to a device for optically determining, preferably visually a certain plane, which device is so constructed that by viewing the device information is obtained either on which side of said plane one self or an object is located or whether one self or the object is located in said plane, and which device comprises at least one screen unit.

The invention comprises a first forward screen forming an angle with the length of a rearward screen located behind the first forward screen, and that said first forward screen has a finer division than said rearward screen, thereby giving rise to interference patterns, so-called moire patterns, when light falls through said screens.

As will appear from the following, optic determinations, in addition to purely visual ones, can be made with visible light, infrared light, laser etc. where, thus, the reading is carried out with a light sensitive equipment adapted for this purpose.

The invention is described in the following in greater detail, with reference to the accompanying drawings, in which FIG. 1 shows a device according to the invention seen obliquely from above, FIG. 2 shows the device according to FIG. 1 seen from above, FIGS. 3a–3c show different interference patterns, to which the device gives rise to, FIG. 4 shows the device from above, with a light source attached behind the same, FIG. 5 shows an embodiment of the invention referring to electronic reading of interference phenomena, FIG. 6 shows an aircraft runway seen in the direction of the final approach, FIG. 7 shows a runway seen from the side and provided with approach lights, FIG. 8 shows the device used as marine navigation auxiliary device.

The formation of moiré patterns is described a.o. in Swedish patent specification No. 7307577-2.

In FIG. 1 a device according to the invention is shown seen obliquely from above, and in FIG. 2 the device is shown seen straight from above. The device comprises a rearward screen 1 and a first forward screen 2, which forms an angle $\alpha$ with the rearward screen 1. The screen lines are formed by transparent lines 4 and non-transparent lines 5. The screen lines in said two screens are in parallel relative to each other. There is further provided a second forward screen 3, which is located substantially to the side of the first forward screen 2 and in parallel with the rearward screen 1. Also the screen lines of said second forward screen 3 are in parallel with the screen lines of the remaining screens 1, 2.

The first forward screen 2 is hingedly connected to the rearward screen 1 at one end thereof by means of a joint 6 adapted for this purpose, which joint renders possible a change of the angle $\alpha$ between the rearward screen 1 and the first forward screen 2.

A movable and lockable stay 7 or the like is provided between the rearward screen 1 and the first forward screen 2 in order to maintain a desired angle between the screens. The second forward screen 3 also is movable from and to the rearward screen 1 where the desired position between the rearward screen 1 and the second forward screen is adjusted and locked by means of a movable and lockable stay 8 between said last mentioned two screen units 1,3.

The screen lines are formed, as mentioned above, by non-transparent lines 5 separated by transparent interspaces 4. The non-transparent lines 5 consist of rods 9 or tubes, which may be made of metallic or plastic material, depending on the size of the device, but preferably they are steel rods or steel tubes.

The rods or tubes 9 are only attached in a parallelepipedic frame 10a–10c extending about every screen 1,2,3, which frame preferably is made of steel. In order to position the device in a stable manner, especially in the case of large units, with respect to weather and wind conditions, suitable stays extend from said frames and are anchored, for example in the ground.

The distance between the rods 9 of the rearward screen 1 in relation to the distance between the rods 9 of the forward screens 2,3 is 9:6 to 9:8, preferably 9:7.5. The thickness of the rods 9 in relation to the distance between the same at the forward screens 2, 3 is 20:7.5 to 10:7.5, preferably 15:7.5.

In a concrete case, thus, the thickness or diameter of the rods or tubes 9 in all screens 1,2,3 is 15 mm, and the distance between the rods or tubes 9 in the rearward screen is 9 mm and in the forward screens 2,3 is 7.5 mm. In such a case, for example, the rearward screen 1 can have a length of about 10 m and a height of about 2 m. As appears from above, in a preferred embodiment all rods or tubes 9 have the same thickness or diameter.

In FIGS. 3a-3c the three types of interference pattern are shown which arise when light falls through a screen device according to the invention.

When the rearward screen 1 forms an angle $\alpha$ with the first forward screen 2 and is in parallel with the second forward screen 3, an interference pattern is obtained which consists of a number of wide dark bands 11, 12 in parallel with the screen lines, as shown in FIG. 3a, when the device is viewed from a direction in the entire normal plane defined by the direction of the screen lines 4,5 and the normal direction to the screen surfaces, provided that the forward screens 2,3 are closer to the viewer than the rearward screen 1.

The interference lines 11, 12, thus, are in aparallel with each other and with the screen lines, referring to both the first forward screen 2 and the second forward screen 3.

When the same screen arrangement is viewed from a direction below said normal plane, the interference pattern arises which is shown in FIG. 3b. This interference pattern also consists of a number of wide bands 13, 12 where the wide bands 13 formed by the rearward screen 1 and the first forward screen 2 form an angle with the lastmentioned screen frame 10b in such a manner, that these bands 13 are angled upward counted from the bands 12 formed by the rearward screen 1 and the second forward screen 3, which lastmentioned bands 12 are in parallel with the screen frame 10c of the second forward screen 3. This effect is achieved thereby that the rearward screen 1 and the first forward screen 2 relative to each other form said angle $\alpha$ and that the rearward screen 1 and the second forward screen 3 are in parallel.

When the same screen arrangement is viewed in a direction above said normal plane, in corresponding manner an interference pattern is formed where wide bands 14 produced by the rearward screen 1 and the first forward screen 2 are angled downward counted from the wide bands 12 formed by the rearward screen 1 and the second forward screen 3, which lastmentioned bands 12 are in parallel with the screen frame 10c of the second forward screen 3.

Owing to the fact that the second forward screen 3 is in parallel with the rearward screen 1, thus, always wide bands 12 are formed which are in parallel with the screen frame 10c of the second forward screen 3, which bands serve as reference bands 12 with respect to the angle formed by the remaining interference pattern 11, 13, 14 with the screen frame 10b of the first forward screen 2. This is a good reference, because the human eye is very sensitive to discontinuous angle changes of a line. The angle formed by the wide bands 11, 13, 14 with the reference bands 12 is a direct measure of how far above or below said normal plane the point is located, from which the viewing is made. The farther above and below, respectively, said normal plane the viewing point is located, the greater is the angle between the angles bands 13, 14 and the reference bands 12. By changing the angle $\alpha$ between the rearward screen 1 and the first forward screen 2 the angle of the angled bands 13, 14 to the reference bands 12 can be made greater or smaller at viewing from a certain viewing point above or below the normal plane. A greater angle between the rearward screen 1 and the first forward screen 2 implies that the angle between the angled bands 13, 14 and the reference bands 12 increases. By adjusting the angle $\alpha$, thus, the sensitivity with respect to the change of the interference pattern for a certain movement of the viewing point can be selected. Depending on the field of application of the device, the angle $\alpha$ can vary considerably, but for outdoor application and for high precision a suitable interval for the angle $\alpha$ is 5° to 25°.

The adjustment of the distance of the second forward screen 2 to the rearward screen 1 is made so that the wide reference bands 12 substantially are of equal width as the angled bands 13, 14.

The device according to the invention, thus, implies that the viewer by viewing the device receives information either on which side of the plane, i.e., above or below the same, defined by the device, i.e., the normal plane, the viewer is located or whether the viewer is in the normal plane.

In FIG. 4 a device according to the invention is shown where a disc 20 of transparent material, for example of opal acrylic resin, is located behind the rearward screen 1, seen from the viewing point. Said disc 20 has at least the same area as the rearward screen 1. Furthermore, a hood 21 is provided in which a number of light sources (not shown) are mounted to effect a uniform lighting of said disc 20. Due to the uniform lighting of the disc, the device also can be utilized in darkness.

When the device is intended for visual viewing, the light sources are arranged to emit visible light.

The device, however, also can be viewed optically thereby, that a light-sensitive means, for example a camera, for converting an image to electric signals receives the light from the light sources behind the screens after the light has passed said screens. After the conversion of the received image to electric signals, a device can evaluate the interference pattern received and thereby give information on whether the object, on which the light-sensitive means is located, is above, below or in the normal plane. In such a case it is suitable that the light sources emit infrared light, so that the light-sensitive device is not disturbed by day-light or artificial general lighting.

A further embodiment is shown in FIG. 5 where behind the rearward screen 1 a light-sensitive device 23 of the aforesaid kind is provided to receive the interference pattern arising when light from an object located at a distance from the device falls through the screens from their front side and against said light-sensitive device 23, i.e., in the direction of arrow 24. The light-sensitive device 23 is arranged to convert the image received to electric signals, which are emitted to a detector 25 for detecting the signals. Said detector also analyses the position of the object in relation to the normal plane by guidance of the interference pattern formed. To the device also a transfer means 26 is connected which transfers the received result to the object via conventional wireless emittance and/or transfers the information to a central processing unit. The light-sensitive device 23 described with reference to FIG. 5 can be arranged to be sensitive for visible light, infrared light or laser light, depending for which purpose and under which conditions the device is applied.

With reference to FIGS. 6 and 7 an example of the application of a device according to the present invention is shown. FIG. 6 shows an aircraft runway 30 seen in the direction of the final approach. To the side of the runway 30, on all great airfields, lamps 31 are mounted which emit two sectors light, one red sector 32 and one white sector 33. The red sector 32 is between an angle of 0° to 3.5° to the horizontal plane, and the white sector is between an angle of 3.5° to 7.0°. The lamps 31 are positioned in the longitudinal direction of the runway 30 symmetrically about the ideal touchdown point for an aircraft. The white sectors 33 show on distance suitable approach angles to the ground, and the red sectors 32 show unsuitable approach angles. The approach angle, however, is individual for each type of aircraft. For large aircraft, such as jet planes for passenger transport, it is dangerous in view of the length of the runway to land the aircraft too close to the remotest lamps 31 in the direction of approach. The pilots, therefore, are forced to be on the boundary between red sector 32 and white sector 33 of the nearest pair of lamps, because it is not possible to decide where in its white sector 33 the aircraft is. This, however, is unsatisfactory in view of the fact that the aircraft approaches near the riskful red sector 32.

By placing a device according to the invention, designated generally by 40, on each side of the runway at the touchdown point and attaching the devices with an angle $\beta$ to the horizontal plane equal to 86.5, the device defines a normal plane with the inclination 3.5° to the horizontal plane, extending from the touchdown point, which normal plane can be followed by the pilot. Due to the fact that a deviation from ideal height of the aircraft, i.e., a deviation from the normal plane, gives rise that the pilot will see interference patterns angled in the way described above, the pilot directly can decide how the aircraft is to be corrected to be in the normal plane. As in the case of the devices described above, the interference pattern will be angled upward when the aircraft is flying too low, and they will be angled downward when the aircraft is flying too high. The directions of correction, thus, are read according to the same principle as for similar instruments in the aircraft.

The angle $\beta$ between the device and the horizontal plane can be adjusted by a device (not shown) so that the angle $\beta$, and therewith the normal plane, are adapted to ideal approach planes of different aircraft types. When the aircraft is flying in an ideal manner, the interference pattern has the appearance shown in FIG. 6. By suitably adjusting the angle $\alpha$ between the rearward screen 1 and the first forward screen 2 a suitable accuracy expressed as the ratio deviation in height from the normal plane to the distance to the touchdown point can be chosen. The present invention renders it possible to obtain high accuracy. For approaching it is suitable that the angle $\alpha$ is such as to enable the pilot to clearly see an angle between the angled bands 13, 14 and the reference bands 12 when the ratio between the deviation in height of the aircraft from the normal plane to the distance to the touchdown point is 1:1000.

At this special application it is suitable to equip the device according to the invention with lighting as mentioned above or to light the device with a light source from the aircraft, as mentioned above, and to use electronic detection of the interference pattern as described.

In a corresponding manner as described in the above examples, the device according to the invention can be used for marine navigation. In FIG. 8 the device 40 is shown in a schematic way set up for marine navigation, in such a manner, that the long sides of the rearward screen 1 are directed vertically. In FIG. 8 the device is positioned on a concrete foundation 41 at a shore. The numeral 42 designates water. At this set-up, thus, the device according to the invention defines a vertical plane in the normal direction to the rearward screen. In a corresponding manner as in the above examples, thus, seafarers can view the device and thereby receive information on how to move the ship in order to be in the normal plane. The angled bands 13, 14 here are angled in relation to the reference bands 12 so, that the direction of correction is the same as the direction in which the angled bands 13, 14 incline relative to the reference bands, i.e., in the same way as described above. The normal plane preferable coincides with the ideal sailing direction.

For lighting the device, a disc 20 with associated light sources as described above can be attached behind in rearward screen 1. In cases when the device is positioned in a place, to which the drawing of electric cables will be expensive, the light sources can consist of gas-light sources controlled by a solar valve in the same way as they are used for beacons. The device according to the invention, of course, can also be provided with means for electronic detection of the interference pattern as well as with light sources emitting infrared light, as described above with relation to the application of the device for approaching aircraft.

A third example of utilizing the device according to the invention is its use as a planoscope, for example at road construction. In this case the device is positioned so that the normal direction for the rearward screen 1 is in parallel with, for example, the desired roadway and on a height above the roadway to be on which the drivers of the road construction machines are, and so that said normal plane substantially is in the horizontal plane. In order to additionally increase for the eye the impression of the interference pattern, two units can be placed above or to the side of one another, and each unit comprises a rearward screen 1, a first forward screen 2 and a second forward screen 3. The units are placed so that each screen 1,2,3 associated with one unit is positioned in the same plane as the corresponding screen 1,2,3 associated with the second unit. The device being positioned as shown in FIG. 1, thus, two devices 1,2,3 are placed above each other, thereby doubling the total viewing area. At this embodiment the two rearward screens 1 and the two second forward screens 3 are chosen with the same division as above for the rear screen 1 and the second forward screen, respectively, while for example the lower first forward screen has a division which is more dense than the rearward screens, and the upper first forward screen has a division which in a corresponding way is more sparse than the rearward screens. Also in this case the device, of course, can be equipped with lighting, electronic image detection etc. as mentioned above.

As appears from the aforesaid, the device according to the present invention offers very great advantages, because it is possible to decide how to move oneself or an object in order to be in a plane defined by the device, the precision being high.

The invention must not be regarded restricted to the above embodiments or to applications described in the above examples, because the invention can be varied within the scope defined by the attached claims.

I claim:

1. A device for optically determining a certain plane comprising, at least two screen units, each screen unit including a first forward screen, a rearward screen and a second forward screen, said rearward screen arranged to form an angle with said first forward screen behind said first forward screen, said second forward screen arranged in front of said rearward screen parallel thereto and substantially to the side of said first forward screen, said screens including a plurality of screen lines arranged parallel relative to each other, the divisions of the screen lines of the first and second forward screens being the same, the divisions of the screen lines of the rearward screen being different than those of the first and second forward screens, the screen lines of said forward screens and said rearward screen being such that when light is passed through said screens interference patterns are formed, the interference pattern formed by the first forward screen and the rearward screen being dark bands disposed generally parallel to the screen lines when the device is viewed in said certain plane, the interference pattern formed by the first forward screen and the rearward screen being dark bands disposed generally at an angle to the screen lines when the device is viewed from a position outside of said certain plane, the interference pattern formed by the second forward screen and the rearward screen being dark bands which always are disposed generally parallel to the screen lines.

2. A device as claimed in claim 1 wherein there are at least two screen units positioned adjacent each other, each screen of the respective screen units being positioned in the same plane as the corresponding screen of the other screen unit, the screen line divisions of the first forward screen of one of the screen units being of greater density than the rearward screen of said one screen unit, the screen line divisions of the first forward screen of the other of the screen units being of lesser density than the rearward screen of said other screen unit.

3. A device as claimed in claim 1 wherein an edge of the rearward screen and an edge of the first forward screen are hingedly connected together, whereby the angle formed between the rearward screen and the first forward screen is variable.

4. A device as claimed in claim 1 wherein the second screen is movable with respect to the rearward screen.

5. A device as claimed in claim 1 wherein the screen lines are formed by tubular members arranged generally parallel with respect to each other with interspaces between said tubular members.

6. A device as claimed in claim 1, further comprising a disc of translucent material positioned adjacent a side of the rearward screen opposite the front side of the rearward screen, the disc having an area generally the same as the area of the front side of the rearward screen, and a light source positioned on a side of the disc opposite the rearward screen for uniformly illuminating the disc.

7. A device as claimed in claim 6 wherein the light source emits visible light.

8. A device as claimed in claim 6 wherein the light source emits infrared light.

9. A device as claimed in claim 1 further comprising light sensitive means positioned on a side of the rearward screen opposite the front side of the rearward screen for receiving and detecting interference patterns arising when light passes through the device and strikes the light sensitive means.

10. A device as claimed in claim 9 wherein the light sensitive means is sensitive to visible light.

11. A device as claimed in claim 9 wherein the light sensitive means is sensitive to infrared light.

12. A device as claimed in claim 9 wherein the light sensitive means is sensitive to laser light.

13. A device as claimed in claim 5 wherein the ratio of the distance between the tubular members of the rearward screen and the distance between the tubular members of both forward screens is between 9:6 and 9:8, and the ratio of the diameter of the tubular members of the rearward screen and the diameter of the tubular members of both forward screens is between 20:7.5 and 10:7.5.

14. A device as claimed in claim 13 wherein the diameter of the tubular members in all screens is the same.

15. A device as claimed in claim 5 wherein the tubular members are arranged in a parallelepipedic frame extending around each screen.

* * * * *